United States Patent
Park et al.

(10) Patent No.: US 11,304,128 B2
(45) Date of Patent: Apr. 12, 2022

(54) APPARATUS FOR SUPPORTING VEHICLE TO EVERYTHING COMMUNICATION, SYSTEM INCLUDING THE SAME, AND METHOD THEREOF

(71) Applicants: Hyundai Motor Company, Seoul (KR); Kia Motors Corporation, Seoul (KR)

(72) Inventors: Jun Ho Park, Gyeonggi-do (KR); Su Lyun Sung, Seoul (KR); Dae Sung Hwang, Gyeonggi-do (KR); Su Ho Park, Seoul (KR); Tae Jun Lee, Gyeonggi-do (KR); Da Yeon Park, Seoul (KR); Hahk Rel Noh, Gyeonggi-do (KR); Cho Rong Ryu, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 62 days.

(21) Appl. No.: 17/030,817

(22) Filed: Sep. 24, 2020

(65) Prior Publication Data
US 2021/0314852 A1 Oct. 7, 2021

(30) Foreign Application Priority Data
Apr. 6, 2020 (KR) .................. 10-2020-0041712

(51) Int. Cl.
*H04W 36/14* (2009.01)
*H04W 48/16* (2009.01)
(Continued)

(52) U.S. Cl.
CPC ............. *H04W 48/16* (2013.01); *H04W 4/40* (2018.02); *H04W 36/14* (2013.01); *H04W 88/06* (2013.01)

(58) Field of Classification Search
CPC ....... H04W 48/16; H04W 4/40; H04W 36/14; H04W 88/06; H04W 4/02; H04W 4/12; Y02D 30/70; H04L 67/12; H04L 12/40058; H04L 12/4015; H04L 67/325; H04L 67/36; H04L 2012/40215; H04L 2012/40273; B60W 50/08
See application file for complete search history.

(56) References Cited

U.S. PATENT DOCUMENTS

2019/0011907 A1* 1/2019 Park .................. G05D 1/0022
2020/0103487 A1* 4/2020 Tzirkel-Hancock ........................ G01S 5/0027

(Continued)

*Primary Examiner* — Julio R Perez
(74) *Attorney, Agent, or Firm* — Mintz Levin Cohn Ferris Glovsky and Popeo, P.C.; Peter F. Corless

(57) ABSTRACT

A V2X communication device, a system including the same, and a method thereof are provided. The V2X communication device includes a communication electronic control unit (ECU) that processes a message transmitted and received wiredly or wirelessly and an application (AP) ECU that identifies a message transmitted and received with the communication ECU through an internal protocol for vehicle and provides corresponding service information. The AP ECU is provided as a system area separated from the communication ECU. The AP ECU and the communication ECU transmit and receive the message via the Ethernet or controller area network (CAN) communication as the internal protocol for the vehicle.

20 Claims, 8 Drawing Sheets

(51) Int. Cl.
*H04W 88/06* (2009.01)
*H04W 4/40* (2018.01)

(56) References Cited

U.S. PATENT DOCUMENTS

| | | | | |
|---|---|---|---|---|
| 2021/0068181 | A1* | 3/2021 | Szil Gyi | H04W 4/40 |
| 2021/0152639 | A1* | 5/2021 | Madden | H04L 67/26 |
| 2021/0272451 | A1* | 9/2021 | Carter | G08G 1/0112 |
| 2021/0377706 | A1* | 12/2021 | Lekutai | H04W 16/14 |
| 2021/0387623 | A1* | 12/2021 | Yetukuri | B60W 40/04 |

* cited by examiner

APPARATUS FOR SUPPORTING VEHICLE TO EVERYTHING COMMUNICATION, SYSTEM INCLUDING THE SAME, AND METHOD THEREOF

CROSS-REFERENCE TO RELATED APPLICATION

This application claims the benefit of priority to Korean Patent Application No. 10-2020-0041712, filed on Apr. 6, 2020, the entire contents of which are incorporated herein by reference.

TECHNICAL FIELD

The present disclosure relates to an apparatus for supporting vehicle to everything (V2X) communication, a system including the same, and a method thereof, and more particularly, relates to an inter-vehicle communication method and an application method for supporting various V2X communication services.

BACKGROUND

Vehicle to everything (V2X) communication refers to a communication mode of exchanging or sharing information such as traffic situations while communicating with a road infrastructure and another vehicle while driving. This refers to a technology of transmitting and receiving information between all elements of the road (e.g., between a vehicle and a vehicle, between a vehicle and an infrastructure, between a vehicle and a pedestrian, between a vehicle and a network, and the like). A V2X-based service may include, for example, an autonomous driving service, a vehicle remote control service, an interactive service for a game, a mass short-range audio/video service such as augmented reality (AR) or virtual reality (VR), or the like.

Recently, a plurality of countries and automotive companies have implemented functions for the purpose of vehicle safety and the efficient use of energy using a V2X communication function. However, it is not easy to ensure marketability of a product for initial market establishment in a situation where many infrastructures are not established. An existing V2X standalone controller may not consider various V2X architectures for saving the cost of manufacturing a system. Furthermore, because of sharing only limited information with an advanced driver assistance system (ADAS) since there is no communication root of the system, the cost of developing products is increased. Thus, there is a need for a V2X communication system and device for supporting various services to address such problems.

SUMMARY

The present disclosure provides an apparatus for supporting V2X communication, a system including the same, and a method thereof. Another aspect of the present disclosure provides a vehicle device for providing V2X communication and a V2X application for supporting various services, a system including the same, and a method thereof. Another aspect of the present disclosure provides a vehicle device for providing a V2X service by distinguishing a unit for performing V2X communication and a unit for processing a V2X application, a system including the same, and a method thereof.

Yet another aspect of the present disclosure provides a vehicle device for performing V2X communication by compensating for a data time delay between electronic control units (ECUs), a system including the same, and a method thereof. Another aspect of the present disclosure provides a vehicle device for performing V2X communication with regard to reception omission of data between ECUs, a system including the same, and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a vehicle to everything (V2X) communication device may include: a communication electronic control unit (ECU) configured to process a message transmitted and received wiredly or wirelessly and an application (AP) ECU configured to identify a message transmitted and received with the communication ECU through an internal protocol for vehicle and provide corresponding service information. The AP ECU may be provided as a system area separated from the communication ECU. The AP ECU and the communication ECU may configured to transmit and receive the message via Ethernet or controller area network (CAN) communication being the internal protocol for vehicle.

In an exemplary embodiment, the communication ECU may configured to communicate with a wireless access in vehicular environment (WAVE) communication system based on wireless-fidelity (Wi-Fi) and a long term evolution/new radio (LTE/NR) communication system based on the 3rd generation partnership project (3GPP) and may configured to perform bidirectional communication between a host vehicle and a remote vehicle, between the host vehicle and a pedestrian, between the host vehicle and a road infrastructure, or between the host vehicle and a network to support a V2X service.

In addition, the AP ECU may configured to identify a V2X service message transmitted from the communication ECU and display the V2X service message using a corresponding application. Additionally, the AP ECU may include at least one of an advanced driver assistance system (ADAS), an audio video navigation (AVN) system, or a cluster system. In an exemplary embodiment, each of the communication ECU and the AP ECU may configured to identify the V2X service message and process, classify, or manage the V2X service message.

The V2X service message may be generated, updated, or discarded in the form of a list. In addition, the V2X service message may be transmitted at a period of about 100 ms. The V2X service message may be transmitted when the ignition is on and may stop being transmitted when the ignition is off.

In an exemplary embodiment, the AP ECU may further include a position correction function of performing position correction for a host vehicle and a remote vehicle with regard to a transmission time delay of a V2X service message transmitted and received from the communication ECU. The time delay may include a delay value generated upon transmission and reception of the Ethernet or CAN communication. The delay value may be variably set by an estimated value or an experimental value.

The AP ECU may further include a position correction function of performing position correction for a host vehicle and a remote vehicle with regard to reception omission of a V2X service message transmitted and received from the communication ECU. The reception omission may be generated upon transmission and reception of the Ethernet or CAN communication. The position correction may be performed by predicting a compensation value for the reception omission. In addition, the communication ECU and the AP ECU may configured to synchronize a list of the V2X service message. The synchronizing may be applied to when the ignition is on or when the ignition is off.

According to another aspect of the present disclosure, a V2X communication method may include: processing a message transmitted and received wiredly or wirelessly and identifying the transmitted and received message through an internal protocol for vehicle and displaying service information corresponding to the message using a corresponding application. A communication ECU processing the message and an AP ECU displaying the service information using the application may be provided as separated system areas. The internal protocol for vehicle may configured to transmit and receive the message via Ethernet or controller area network (CAN) communication.

In an exemplary embodiment, the processing of the message may include communicating with a WAVE communication system based on Wi-Fi and an LTE/NR communication system based on the 3GPP. The message may include a message for supporting a V2X service by performing bidirectional communication between a host vehicle and a remote vehicle, between the host vehicle and a pedestrian, between the host vehicle and a road infrastructure, or between the host vehicle and a network.

Additionally, the displaying may include identifying the message for supporting the V2X service and displaying the V2X service message on a corresponding application system. The displaying may further include displaying information corresponding to the V2X service message on at least one of an advanced driver assistance system (ADAS), an audio video navigation (AVN) system, or a cluster system.

The processing of the message may include identifying, by each of the communication ECU and the AP ECU, the V2X service message and processing, classifying, or managing, by each of the communication ECU and the AP ECU, the V2X service message. The V2X service message may be generated, updated, or discarded in the form of a list. Additionally, the V2X service message may be transmitted at a period of about 100 ms. The V2X service message may be transmitted when the ignition is on and may stop being transmitted when the ignition is off.

In an exemplary embodiment, the displaying may further include performing a position correction function of performing position correction for a host vehicle and a remote vehicle with regard to a transmission time delay of a V2X service message transmitted and received from the communication ECU. The time delay may include a delay value generated upon transmission and reception of the Ethernet or CAN communication. The delay value may be variably set by an estimated value or an experimental value.

Further, the displaying may include performing a position correction function of performing position correction for a host vehicle and a remote vehicle with regard to reception omission of a V2X service message transmitted and received from the communication ECU. The reception omission may be generated upon transmission and reception of the Ethernet or CAN communication. The position correction may be performed by predicting a compensation value for the reception omission. In an exemplary embodiment, the processing of the message may further include synchronizing, by the communication ECU and the AP ECU, a list of the V2X service message. The synchronizing may be applied to when the ignition is on or when the ignition is off.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
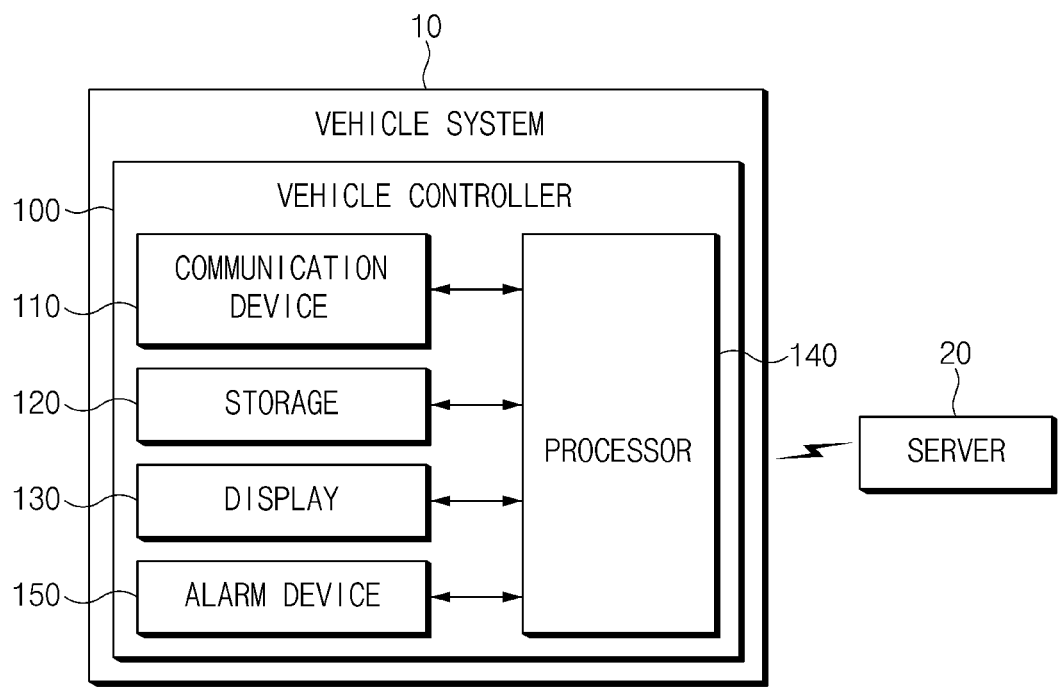
FIG. 1 is a block diagram illustrating a configuration of a vehicle system for supporting V2X communication according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the exemplary embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, exemplary embodiments of the present disclosure will be described in detail with reference to FIGS. 1 to 6. FIG. 1 is a block diagram illustrating a configuration of a vehicle system including an autonomous controller according to an exemplary embodiment of the present disclosure. Referring to FIG. 1, a vehicle controller 100 according to an exemplary embodiment of the present disclosure may include a communication device 110, a storage 120, a display 130, a processor 140, and an alarm device 150.

The communication device 110 may be a hardware device implemented with various electronic circuits to transmit and receive a signal via a wireless or wired connection. In an exemplary embodiment of the present disclosure, the communication device 110 may be configured to perform inter-vehicle communication via controller area network (CAN) communication, control area network flexible data rate (CAN FD) communication, local interconnect network (LIN) communication, Ethernet communication, or the like. The communication device 110 may include various communication units, for example, a mobile communication unit, a broadcast receiving unit, such as a digital multimedia broadcasting (DMB) module or a digital video broadcasting-handheld (DVB-H) module, a short-range communication unit, such as a ZigBee module or a near field communication (NFC) module which is a Bluetooth module, and a wireless-fidelity (Wi-Fi) unit to communicate with a server 20 outside a host vehicle, an external diagnostic device, and the like. Herein, the CAN communication may be a network system for vehicle developed to provide digital serial communication between various measurement control equipments in the host vehicle. A CAN-data bus may be used for data transmission and control between ECUs.

The communication device 110 according to an exemplary embodiment may be configured to perform bidirectional communication between the host vehicle and a remote vehicle, between the host vehicle and a road infrastructure, and between the host vehicle and a pedestrian, and continue sharing and transmitting and receiving data with all elements including the host vehicle and vehicles around the host vehicle (e.g., in the vicinity of the host vehicle). The communication device 110 itself may be mounted in the host vehicle, or the communication device 110 may be configured in a form where a V2X communication terminal including the communication device 110 comes into contact with the host vehicle. As a result, vehicle-to-vehicle (V2V) communication and vehicle-to-infrastructure (V2I) communication are possible, and autonomous driving may be performed to a predetermined destination using a vehicle sensor and a driving control function, which are included in the host vehicle. Herein, the vehicle sensor may include at least one of a global positioning system (GPS) sensor, a gyro sensor, or an acceleration sensor. In other words, the communication device 110 may support an autonomous driving service by being linked with infrastructure information added via a V2X communication function.

Accordingly, the communication device 110 may support a wireless access in vehicular environment (WAVE) communication technology for the V2X communication function or may support a communication technology of a long term evolution/new radio (LTE/NR) system based on 3rd generation partnership project (3GPP). For reference, WAVE communication is a technology of modifying IEEE 802.11a WLAN technology, which has features of using a dedicated band of 5.9 Ghz, having a channel frequency bandwidth of 10 Mhz, and having a maximum data rate of 27 Mbps, has a feature where wireless channel access is a carrier sense multiple access with collision avoidance (CSMA/CA) method, and has a feature of consisting of IEEE 802.11p physical layer and 1609 communication stacks.

Meanwhile, when supporting a 3GPP system, the communication device 110 may include LTE eV2X and 5G V2X communication technology, based on LTE V2X (Rel. 14). V2X communication may include vehicle-to-vehicle (V2V) referring to LTE/NR communication between vehicles, vehicle-to-pedestrian (V2P) referring to LTE/NR communication between a vehicle and a terminal carried by a person, and vehicle-to-infrastructure/network (V2I/N) referring to LTE/NR communication between a vehicle and a unit/network by the roadside and may have features of improving network scalability in V2I communication using orthogonal frequency division multiple access (OFDMA) radio access. In other words, the V2X communication may have an advantage where cell coverage is expanded through a 3GPP network system.

Furthermore, there is no limit to a multi-access technique of a wireless communication system to which an exemplary embodiment of the present disclosure is applied. For example, various multi-access techniques such as code division multiple access (CDMA), time division multiple access (TDMA), frequency division multiple access (FDMA), orthogonal frequency division multiple access (OFDMA), single carrier-FDMA (SC-FDMA), OFDM-FDMA, OFDM-TDMA, and OFDM-CDMA may be used. Furthermore, a time division duplex (TDD) mode where data is transmitted in a different time or a frequency division duplex (FDD) mode where data is transmitted using a different frequency may be used for uplink transmission or downlink transmission.

The storage 120 may be configured to store data downloaded for vehicle wireless update, which is received from a server 20 via the communication device 110. Thus, the storage 120 may be configured to store, manage, or update information regarding the road and information regarding a road environment, for example location information of the host vehicle, road information, a bus stop, via vehicle sensors mounted in the host vehicle and the server 20. Furthermore, the storage 120 may be configured to store destination information set by a user, existing discovered path information, or the like. Furthermore, according to an exemplary embodiment of the present disclosure, the storage 120 may be configured to receive and store, manage, or update each communication system information for V2X communication via a communication server.

Alternatively, the storage 120 may be configured to store or manage data via a server which supports data for various input sensors for supporting autonomous driving, road information, communication information, and the like. Furthermore, the storage 120 may be configured to store communication information for the V2X service and V2I/N information. Furthermore, the storage 120 may be configured to store at least one of a network load, a vehicle power state, a battery state, or a time expected to transmit remaining ROM data, which is determined by the processor 140.

The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The display 130 may be operated by the processor 140 to display a screen for granting user authentication for a wireless update of the host vehicle. The display 130 may be implemented as a head-up display (HUD), a cluster, an audio video navigation (AVN), or the like. Furthermore, the display 130 may include at least one of a liquid crystal display (LCD), a thin film transistor-LCD (TFT-LCD), a light emitting diode (LED) display, an organic LED (OLED) display, an active matrix OLED (AMOLED) display, a flexible display, a bended display, and/or a three-dimensional (3D) display. Some thereof may be implemented as transparent displays configured as a transparent type or a semi-transparent type to see the outside. Moreover, the display 130 may be implemented as a touchscreen including a touch panel to be used as an input device other than an output device.

The processor 140 may be electrically connected with the communication device 110, the storage 120, the display 130, the alarm device 150, or the like and may be configured to electrically operate the respective components. The processor 140 may be an electrical circuit configured to execute instructions of software and perform a variety of data processing and calculation described below.

As described above, according to an exemplary embodiment of the present disclosure, the processor 140 may be configured to recognize surrounding information for predicting an object/road situation around the host vehicle or a congestion level around the host vehicle using vehicle sensors located in front and rear portions in the host vehicle and identify a path congestion level of the host vehicle, which is predicted using the vehicle sensor, and an external server, thus operating a device for a vehicle guide service. Furthermore, the processor 140 may be configured to manage, delete, or update information for processing wireless communication data and application data according to a necessary V2X service.

In other words, with regard to location information regarding the host vehicle and a vehicle adjacent to the host vehicle, which is provided via a communication system server and a corresponding telematics server as the V2X service is supported via a navigation device and a user communication device included in the host vehicle, the processor 140 may be configured to perform position correction of the vehicle adjacent to the host vehicle and display a guidance and an alarm for predicting a road situation according to the corrected position, thus performing emergency relief and a vehicle control function for driver safety.

When a screen for being granted from the user is displayed on the display 130, the alarm device 150 may be configured to output a notification for approval to the user. Alternatively, the alarm device 150 may be configured to provide a driving guidance, such as path resetting for a congestion level or an alarm for the congestion level, and provide a variety of information for a V2X service for traffic safety or the like.

Figure 2:
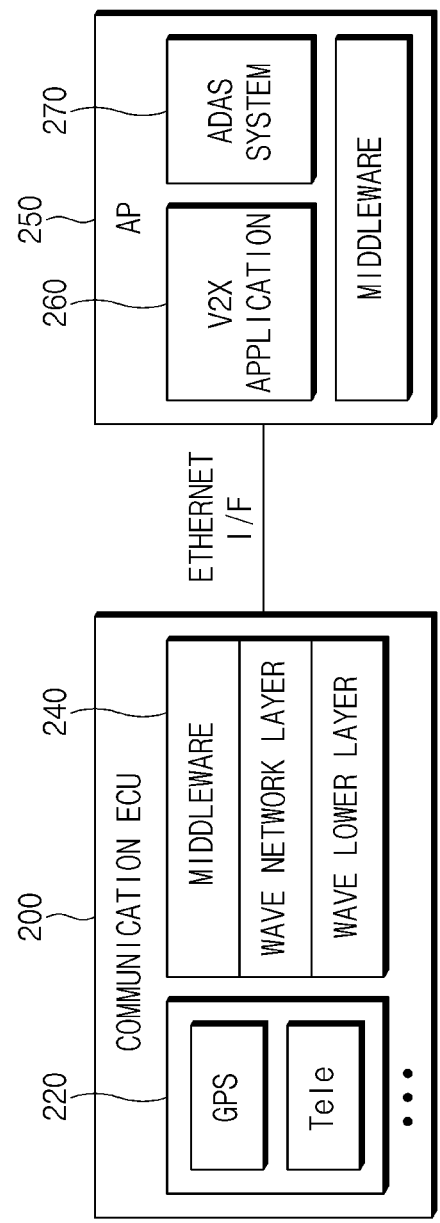
FIG. 2 is a block diagram illustrating a V2X service system according to an exemplary embodiment of the present disclosure.

FIG. 2 is a block diagram illustrating a V2X service system according to an exemplary embodiment of the present disclosure. Referring to FIG. 2, a vehicle according to an exemplary embodiment of the present disclosure may include a plurality of electronic control units (ECUs). The ECU may be connected with internal/external communication to increase safety of a user and provide various convenience functions. The ECU may be provided as an airbag control unit (ACU), an engine control unit (ECU), a transmission control unit (TCU), a brake control unit (BCU), an on-board-diagnostics (OBD), or the like. As described above, the ECU may be configured to connect an internal component with an external system by performing CAN communication as well as Ethernet which is an internal protocol, that is, by using various protocols suitable for a feature of each system. Furthermore, the ECU may be equipped with software to execute various services of a host vehicle.

Particularly, with the development of a V2X communication service for a smart traffic service, a vehicle system according to an exemplary embodiment of the present disclosure may be connected with a smart car, an infrastructure, a backend server, or the like based on a wired/wireless network to share information via data exchange and support an intelligent transport system (ITS) service of ensuring safety, improving traffic efficiency, and providing user convenience. Accordingly, the vehicle system may provide the user with various services, such as traffic information and map information, as well as driving or braking which is a basic control function of the host vehicle according to communication in the system via a communication ECU 200, and may be connected with a smart device via various wireless network systems to provide a V2X service such as real-time road information or vehicle remote control.

Thus, the vehicle system according to an exemplary embodiment of the present disclosure may be configured in the form of a system which separately includes the communication ECU 200 for processing a V2X message and an application (AP) ECU 250 for performing a V2X application function. The communication ECU 200 may be configured to divide and process wireless signals transmitted from different communication systems into a physical layer signal or an upper layer signal based on a corresponding communication technology, generate a V2X communication message for the host vehicle from the processed signal, and transmit the generated V2X communication message to AP ECUs for implementing a corresponding V2X service, such that a corresponding application processes the V2X communication message in various forms. In other words, the vehicle system may include the communication ECU 200 for processing V2X communication signals of various wired/wireless communication systems, for example, a global positioning system (GPS), a telematics communication system, a wireless-fidelity (Wi-Fi) communication system, and a 3GPP system and the AP ECU 250 for processing V2X application data according to each system in a divided form to form a V2X detachable system.

Herein, the communication ECU 200 may include a signal processor 220 for processing signals transmitted and received with a GPS, a telematics communication system, a Bluetooth communication system, a USB communication system, a Wi-Fi communication system, a WAVE communication system, and/or an LTE/5G communication system. The signal processor 220 may be provided in the form of a module divided according to each system to process a signal of the system or may be provided in the form of being integrated into one processor to process a signal of the system.

As an example, the signal processor 220 may be implemented to include a GPS receiver. Thus, the signal processor 220 may be configured to receive signals transmitted from three or more GPS satellites to determine a location between the satellite and the receiver. In other words, when measuring a time difference between a signal transmitted from the satellite and a signal received from the receiver, the signal processor 200 may be configured to obtain a distance between the satellite and the receiver. In particular, information regarding the location of the satellite may be included in the transmitted signal.

In other words, when knowing distances from a minimum of three satellites and a location of each satellite, the signal processor 220 may be configured to calculate a location of the receiver, that is, the host vehicle using a method such as trilateration. Furthermore, the signal processor 220 may include a telematics receiver. Thus, when an information request by a user occurs through a computer mounted in the host vehicle, the signal processor 220 may be configured to transmit the information request to a telematics server. Thereafter, the signal processor 220 may be configured to receive information, collected from a telematics provider, using the GPS and a wireless communication technology and provide the received information as user information. Furthermore, the signal processor 220 may be configured to perform signaling of a BSM message or a V2X message transmitted from Wi-Fi, WAVE, and LTE/5G communication systems according to an exemplary embodiment of the present disclosure.

Herein, the communication ECU 200 according to an exemplary embodiment of the present disclosure may be implemented to add only a V2X communication function depending on a wireless communication system to be applied to increase a degree of reuse of an existing communication system and enhance a degree of utilization of another communication function. In particular, V2X-WiFi co-existence will be described as an example for ease of description. Thus, the communication ECU 200 may include a WAVE lower layer for processing a wireless signal transmitted from an external/internal GPS, telematics, and Wi-Fi device 220 and a V2X service message received over an external communication network, a WAVE network layer for performing signaling of the WAVE lower layer and processing upper layer data, and a middleware layer 240 for processing internal communication data in the host vehicle and wireless communication data.

Thus, the AP ECU 250 may be configured to add a corresponding V2X message processing function to a V2X application 260 for processing V2X service messages delivered from the communication ECU 200, an advanced driver assistance systems (ADAS) and autonomous driving related application 270 with the high degree of utilization of V2X, or the like, thus simplifying a structure of an application system and increasing the degree of utilization of the same information.

As described in an exemplary embodiment of the present disclosure, the V2X service may include communication between the host vehicle and a remote vehicle, and wireless communication is possible between vehicles via the communication ECU 200 mounted in the host vehicle. Thus, the communication ECU 200 may be connected with an external device based on a GPS, a telematics communication system, a Bluetooth communication system, a USB communication system, a Wi-Fi communication system, a WAVE communication system, and an LTE/5G communication system to perform communication processing for an entertainment service, a firmware update, and remote start, eCall, and autonomous driving services. In other words, the host vehicle and a remote vehicle may be configured to communicate with each other to transmit or receive a BSM message including location information and driving information.

As a result, the host vehicle and the remote vehicle may provide various services, such as a road information notification and a vehicle information notification, to exchange information regarding an accident and the attention of the driver. As an example, there may be a greater number of information items such as a roadside information and obstacle notification, a road construction notification, an intersection signal (situation) information notification, a remote vehicle information notification, an emergency vehicle (ambulance or fire truck) approach notification, a real-time traffic information collection and toll collection service, a pedestrian notification service, and a protected zone notification, which are V2X services.

Furthermore, when performing vehicle communication using a mobile communication network such as an LTE/NR system, a limited communication coverage problem may be solved when using the mobile communication network other than direction communication between vehicles to transmit more data, thus supporting an image service and various services for a high-bandwidth complex scenario, for example, autonomous driving, platooning, and cooperative driving. In conjunction with a vehicles platooning service, a plurality of vehicles dynamically form a group and extended sensors are applicable to a technology or the like of collecting and exchanging data obtained from a sensor or a video image. Furthermore, advanced driving may be a technology where the vehicle travels based on full automation or semi-automation. In addition, remote driving may be a technology for remote control of the vehicle and a technology for providing an application used for operating the vehicle.

Figure 3:
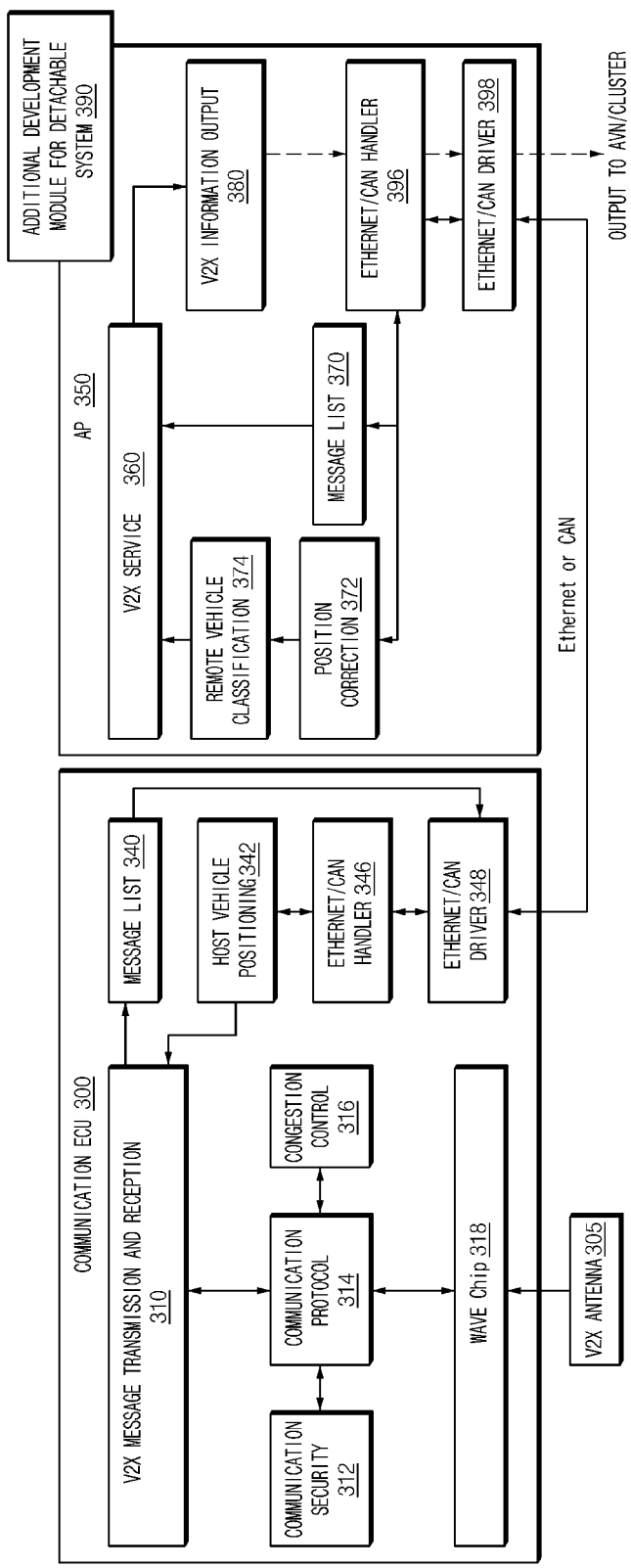
FIG. 3 is a drawing illustrating in detail components of a vehicle communication system for V2X service according to an exemplary embodiment of the present disclosure.

FIG. 3 is a drawing illustrating in detail components of a vehicle communication system for V2X service according to an exemplary embodiment of the present disclosure. Referring to FIG. 3, a communication ECU 300 may include a V2X message transmission and reception device 310, a communication protocol unit 314, a communication security unit 312, a congestion control unit 316, a V2X chip 318, and the like, which are functions of processing a signal of a wireless communication system for supporting a V2X service.

The V2X chip 318 may be configured to transmit and receive V2X message information, transmitted and received via a V2X antenna 305, in the form of wireless communication. In an exemplary embodiment of the present disclosure, WAVE communication will be described as an example for ease of description. Thus, a WAVE modem chip may be used for the V2X chip 318. Furthermore, the V2X antenna 305 may refer to a device configured to receive V2X wireless signals according to an exemplary embodiment of the present disclosure, which may include a wireless antenna mounted in the host vehicle, which receives a corresponding V2X signal.

As an example, when based on a wireless communication system, V2X user equipment (UEs) may be configured to exchange their own state information over a sidelink and exchange information or the like for a corresponding service with infrastructure nodes and/or pedestrians. The V2X service may require QoS requirements capable of satisfying low delay and high reliability. In particular, to satisfy the above-mentioned QoS requirements, access stratum (AS) level QoS management may be required. AS level information may include at least one of UE capability, QoS related information, radio bearer configuration, or physical layer configuration.

Thus, the V2X message transmission and reception device 310 may be configured to receive and manage a message of a physical or upper layer or the like for supporting a V2X service received via the communication ECU and may be configured to receive and manage communication information necessary from a service point of view. The V2X message may be managed in the form of a message list based on an application layer. A position correction controller 372 may be configured to reflect host vehicle position information and positioning information regarding a remote vehicle based on information received from a message management device 370.

Thus, an Ethernet/CAN handler 346 and an Ethernet/CAN driver 348 may be configured to deliver the identified host vehicle position information and V2X service messages to the AP ECU 350 via Ethernet or CAN communication under a communication protocol between ECUs implemented in vehicles.

The AP ECU 350 may include a V2X service determining device 360 configured to determine a V2X service, a remote vehicle classifier 374, the position correction controller 372, the message management device 370, or the like. Furthermore, V2X information according to the determined V2X service may be output selectively or in the form of being fixed in the system to fit requirements of a user based on a corresponding AP system (see reference numeral 380). The V2X service information may be shared with ECUs of a system which satisfies a corresponding service.

Accordingly, a middleware layer for V2I message management, TC (Target Classification), or the like or a V2I application layer may be provided. Herein, in conjunction with a V2X/I message, the V2X information output device 380 may be configured to transmit a probe vehicle data (PVD) message, which is state information of the host vehicle, to a center system via a road side unit. The center system may be configured to provide a vehicle with various services by transmitting map data, a traveler information message (TIM), which is an information guide message such as section information and a speed limit, a radio technical commission for maritime services (RTCM) message, which is an accurate positioning correction message. Furthermore, the road side unit may be configured to transmit a roadside alert (RSA), which is a road dangerous situation message collected by a supporting system, and a signal phase and timing (SPaT), which is a traffic signal state message, to a vehicle to guide the vehicle to perform safety driving. The V2X information output device 380 may include an AVN system, an ADAS system, a cluster system, or communication terminals of a driver.

As described above, the communication ECU 300 and the AP ECU 350 may include a function for processing/classifying and managing a V2I message to support a V2X service. In other words, position correction for the V2X service may include estimating remote vehicle (RV) position information (e.g., longitude, latitude, heading) based on a current time. A message list may include establishing synchronization between a communication control unit (CCU) and an ADAS_DRV to perform a function of generating, updating, or discarding a V2I message list. In other words, each of the communication ECU 300 and the AP ECU 350 configured according to the V2X service may be configured to identify a message set to efficiently and accurately process the V2X message and may require a device for performing message processing/classification and management for efficiently and accurately processing the V2X message. As described above, the communication ECU 300 and the AP ECU 350 according to an exemplary embodiment of the present disclosure may be configured to perform Ethernet or CAN communication. Thus, there is a need for definition of data transmitted and received for a V2X service between the CCU and the ADS_DRV mounted in the vehicle.

Accordingly, in an exemplary embodiment of the present disclosure, a data transmission and reception message based on Ethernet is defined, and a feature of the message will be described. Table 1 below discloses a message transmitted and received through the Ethernet between the communication ECU and the AP ECU according to an exemplary embodiment of the prevent disclosure. Herein, RV List denotes a remote vehicle list, and LPH denotes a local position handler.

TABLE 1

| Message Name | Sender | Receiver | Send Type | Cycle Time | Description |
|---|---|---|---|---|---|
| V2X_LPH_01_100ms | CCU | ADAS_DRV | P | 100 ms | BSM Part1 information of host vehicle |
| V2X_LPH_02_100ms | CCU | ADAS_DRV | P | 100 ms | BSM Part2 information of host vehicle (including only information which is in use) |
| V2X_RVList_100ms | CCU | ADAS_DRV | P | 100 ms | V2V RV List information |
| V2X_RVListX_01_100ms | CCU | ADAS_DRV | P | 100 ms | BSM Part1 information of remote vehicle X(1~10) |
| V2X_RVListX_02_100ms | CCU | ADAS_DRV | P | 100 ms | BSM Part2 information of remote vehicle X(1~10) (including information which is in use) |
| V2X_TIM_01_E100ms | CCU | ADAS_DRV | E | 100 ms | V2I TIM message information |
| V2X_SPAT_01_E100ms | CCU | ADAS_DRV | E | 100 ms | V2I SPAT message information |
| V2X_MAP_01_E100ms | CCU | ADAS_DRV | E | 100 ms | Basic information of V2I MAP message + lane 1~3 information |
| V2X_MAP_02_E100ms~ V2X_MAP_13_E100ms | CCU | ADAS_DRV | E | 100 ms | Lane 4~6 information of V2I MAP message~ lane 37~39 information of V2I MAP message |
| V2X_MsgList_01_100ms | ADAS_DRV | CCU | P | 100 ms | Message list information which is being managed by DRV |

As shown in Table 1 above, an Ethernet transmission and reception message according to an exemplary embodiment of the present disclosure has transmission requirements as shown below and may be applied in common.

All messages are transmitted at a period of 100 ms.
The period is maintained at 100 ms although the send type is the event.
Herein, P refers to being transmitted periodically.
A message send time of each message is a time when data is transmitted to the Ethernet, rather than a time when data is generated.
An alive count of each message is increased by 1 every transmission and is reset to 0 when greater than a maximum value.
The description of all signals is maintained the same as the V2X message standard (J7235) (unavailable, invalid, and the like).

Herein, a signal where 'unavailable/invalid' is not defined in the V2X message standard (J7235) is transmitted with the value of '0'.

Transmission requirements of the RVList will be described below. Herein, when a state of the vehicle is an ignition-on state, the vehicle is in a driving state, and when the state of the vehicle is an ignition-off state, the vehicle is in a parked state.

After the ignition is on, the LPH is transmitted and the RVList message is transmitted.
After the ignition is off, the LPH stops being transmitted and the RVList message stops being transmitted.
All RVList messages are always transmitted irrespective of whether there is an RV or the number of RVs.
All signals of a list where there is no RV are reset to the value of '0' to be transmitted.
Signals of the RVList message are the same as BSM reception information.
An RVNums value in the RVList message refers to the number of RV lists which are actually managed.
Although the number of RVs is greater than 10, the RVNums value refers to a number greater than 10.
10 vehicles of the RVList are ordered from a vehicle with a high priority based on priority specifications.
RV information where there is a problem with security is not transmitted to the list.

Herein, a method for selecting a priority of the RVList may be set with reference to the example below. For example, when the number of RVs in the RVList is greater than a transmissible number (10), a description will be provided for transmitting only 10 RVs according to a rule below.

Priority 1 Vehicle, which is present in front of a host vehicle, in which an event occurs, which has a close relative distance from the host vehicle
Priority 2 Vehicle, which is present in front of the host vehicle, in which an event does not occur, which has a close relative distance from the host vehicle
Priority 3 Vehicle, which is present behind the host vehicle, in which an event occurs, which has a close relative distance from the host vehicle
Priority 4 Vehicle, which is present behind the host vehicle, in which an event does not occur, which has a close relative distance from the host vehicle Traveler information message (TIM) transmission requirements will be described below.

After the ignition is on and after a V2I TIME message is received, a TIM message is transmitted.
After the ignition is off or when the V2I TIME message is not received, the TIM message stops being transmitted.
The TIM message is transmitted in an event manner, but a transmission timing is transmitted together with an LPH/RVList message and a transmission period is fixed to 100 ms.
When only one V2I TIME message is received within 100 ms, a corresponding TIM message is transmitted only once at a next Ethernet transmission period.

When two or more V2I TIM messages are received within 100 ms, a TIM message is sequentially transmitted one by one every Ethernet transmission period after the reception.

When a new V2I TIM message is received in a state where all the received TIM messages are not transmitted, after the transmission of all the old TIM messages is completed, a new TIM message is transmitted.

When several TIM messages are received, they are transmitted in an order in which they are received.

When 10 or more TIM messages are received, only 10 buffers are managed and messages greater than 10 are not transmitted.

Signal phase and timing (SPAT)/MAP transmission requirements may be defined as those below.

After the ignition is on and after a V2I SPAT/MAP message is received, a SPAT/MAP message is transmitted.

After the ignition is off or when the SPAT/MAP message is not received, the SPAT/MAP message stops being transmitted.

The SPAT/MAP message is transmitted in an event manner, but a transmission timing is transmitted together with an LPH/RVList message and a transmission period is fixed to 100 ms.

The SPAT message is transmitted whenever a V2I SPAT message is received, whereas the MAP message is transmitted only once irrespective of whether the V2I MAP message is received.

When there is a SPAT & MAP message having the same intersection ID, that is, only when the SPAT & MAP message forms a pair, the message is transmitted.

When two or more V2I SPAT/MAP messages are received within 100 ms, a SPAT/MAP message is sequentially transmitted one pair by one pair every Ethernet transmission period after the reception.

A V2I message list function configured in the communication ECU and the AP ECU may be configured to synchronize a list of messages used between a communication ECU module and an AP ECU module, thus applying the same condition as that before the ignition is off to an application when the ignition is off/on. By performing such synchronization, a continuous operation may be performed without delay.

As an example, a TIM for road construction section information and a SPAT/MAP message for traffic signal information, and the like may be managed among V2I messages. Basically, a V2I message list for a vehicle progress direction (there is a probability of occurring) based on a location of a host vehicle is added. When the host vehicle passes through a corresponding event position, a corresponding V2I message is deleted from the list. Herein, services associated with the V2I message are as follows:

1) Real-time traffic information collection and providing service

An on-board unit (OBU) of a vehicle may be configured to transmit state information, position information, and driving information of the vehicle to a center system, which is a backend server, via a road side unit to be stored. The center system may then be configured to provide a service for transmitting processed traffic information to a remote vehicle to cause the remote vehicle to rapidly recognize a road situation.

2) Toll collection service

The toll collection service may be configured to collect a toll while a vehicle maintains a driving speed, which has a difference from an existing service in the vehicle stops and drives slowly at a tollgate to pay a toll.

3) Roadside information and obstacle notification service

The roadside information and obstacle notification service is a service where a road side unit may be configured to provide safety driving information and situation information to a remote vehicle in advance with respect to a potential threat, such as a crack in road, an icy road, or an obstacle, and a real-time unexpected situation.

4) Road work notification service

The road work notification service is a service where a road side unit may be configured to provide a road work situation such as road construction or cleaning which is in progress on the road to a remote vehicle.

5) Intersection signal information notification service

The intersection signal information notification service is a service where a road side unit may be configured to output a notification to a vehicle passing through an intersection of intersection signal information, to thus prevent a possible collision accident and traffic signal violation.

6) Protected zone notification service

The protected zone notification service is a service where a road side unit installed on a protected zone such as a school zone or a silver zone may be configured to transmit the speed limit and protected zone information to a remote vehicle to guide the driver for safe driving.

7) Pedestrian notification service

There pedestrian notification service is a service where a road side unit may be configured to detect a pedestrian or a bicycle around an intersection or a crosswalk and provide information to a remote vehicle to guide the driver to prevent a collision accident and improve vehicle and driving safety.

Thus, a list storing a corresponding V2X message may be stored in a navigation (NV) memory to be immediately used when the system is turned on/off.

1) TIM List: A TIM message received from a CCU in an event manner is managed in the list, and the managed list may be provided to a V2X service.

The list is managed using a buffer, and the number of buffers of the TIM list is N.

The list is newly generated, is updated and deleted, and is stored and managed in a memory according to requirements.

2) SPAT/MAP List: A SPAT/MAP message received from a CCU in an event manner is managed in the list, and the managed list is provided to a V2X service.

The list is managed using a buffer, and the number of buffers of the SPAT/MAP list is N.

The list is newly generated and is updated, deleted, and managed according to requirements.

Meanwhile, the TIM list management will be described below.

1) Event information received using a TIM message is classified as a different event using FurtherinfoID (Signal Name: V2X_TIM_01_FurtherinfoID) data.

When a TIM message having FurtherinfoID which is not present in the list is received, the received TIM message is registered as new event information with the list.

When a TIM message having the same FurtherinfoID as the list is received, the received TIM message is updated to a new TIM message in the list.

2) When event information of the list is not updated to new TIM information over a specified time t1, it is deleted from the list. Herein, t1 may be set to 3600.0 s.

When the TIM message having the same FurtherinfoID as the list is not received during the specific time t1, event information of the FurtherinfoID is deleted from the list.

The SPAT/MAP list management will be described below.

1) Intersection information is used to manage a SPAT message and a MAP message as one pair based on an intersection ID value.

When both of a SPAT message and a MAP message, each of which has the same intersection ID, are received, they are registered as new intersection information with the list.

When a SPAT message and a MAP message, each of which has a different intersection ID, are received, they are not registered as new intersection information with the list.

2) Intersection information received using a SPAT or a MAP is classified as a different intersection using intersection ID data.

When a SPAT & MAP message having an intersection ID which is not present in the list is received, the received SPAT & MAP message is registered as new intersection information with the list.

When an SPAT & MAP message having the same intersection ID as the list is received, the received SPAT & MAP message is updated to a new SPAT & MAP message in the list.

3) When intersection information of the list is not updated to new SPAT & SPAT information over a specified time t1, it is deleted from the list. Herein, t1 may be set to 10.0 s.

When the SPAT & MAP message having the same intersection D as the list is not received during the specific time t1, intersection information of the intersection ID is deleted from the list.

Herein, the intersection ID may be defined as 1) Region ID (Signal Name: V2X_SPAT_01_RegionID, V2X_MAP_01_RegionID) and 2) Inter ID (Signal Name: V2X_SPAT_01_InterID, V2X_MAP_01_InterID). In addition, the V2X system according to an exemplary embodiment of the present disclosure may include a position correction function. This is for compensating for a position with respect a message for use in an application, which is essentially implemented for detachable development. Accordingly, a position correction module may be implemented in an AP at an application to correct a corresponding module at a time with regard to communication delay.

1) A time delay occurring according to data flow is compensated to estimate a location of a host vehicle (HV).

Time delay

① An HV positioning module of the communication ECU~a transmission device of the communication ECU: identify a time delay between from a time when a position of the HV is generated to a time when communication data is generated. This is sufficient to perform an existing function.

② A transmission device of the communication ECU~a position correction module of an AP ECU: identify a time delay due to ETH transmission and reception. This may be configured as an additional function for a detachable system.

CCU-ETH Handler~DRV-AP: a method of measuring an Ethernet transmission and reception delay value and reporting the result is applicable in an initial version. Herein, the report method may be defined later. Thus, before defining the report method, an estimation value of an Ethernet transmission and reception delay or an experimentally derived value may be determined as T. Herein, T may be used by defining a specific constant value which is not changed.

2) A time delay occurring according to data flow and remote vehicle (RV) data reception omission are compensated to estimate a location of an RV.

Time delay

① An RV positioning module of the communication ECU~a transmission device of the communication ECU: identify a time delay between from a time when a position of the RV is generated to a time when ETH communication data is generated. This is sufficient to perform an existing function.

② The transmission device of the communication ECU~a position correction module of an AP ECU: identify a time delay due to ETH transmission and reception. This may be configured as an additional function for a detachable system.

CCU-ETH Handler~DRV-AP: a method of measuring an Ethernet transmission and reception delay value and reporting the result is applicable in an initial version. Herein, the report method may be determined later. Thus, before defining the report method, an estimation value of an Ethernet transmission and reception delay or an experimentally derived value may be determined as T. Herein, T may be used by defining a specific constant value which is not changed.

Reception omission: A position correction function should be performed with regard to when RV information is not periodic and communication disconnection occurs.

Figure 4A:
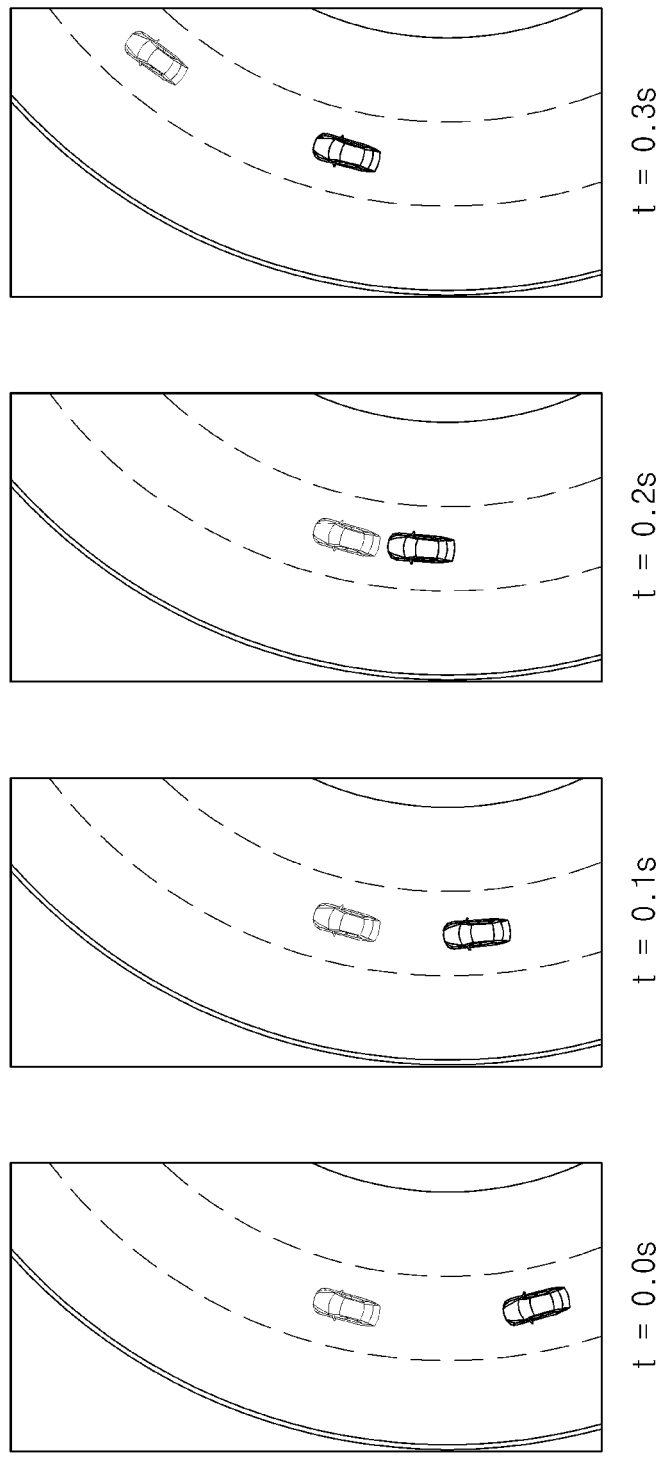
FIGS. 4A and 4B are drawings illustrating a function of performing position correction according to another exemplary embodiment of the present disclosure.
Figure 4B:
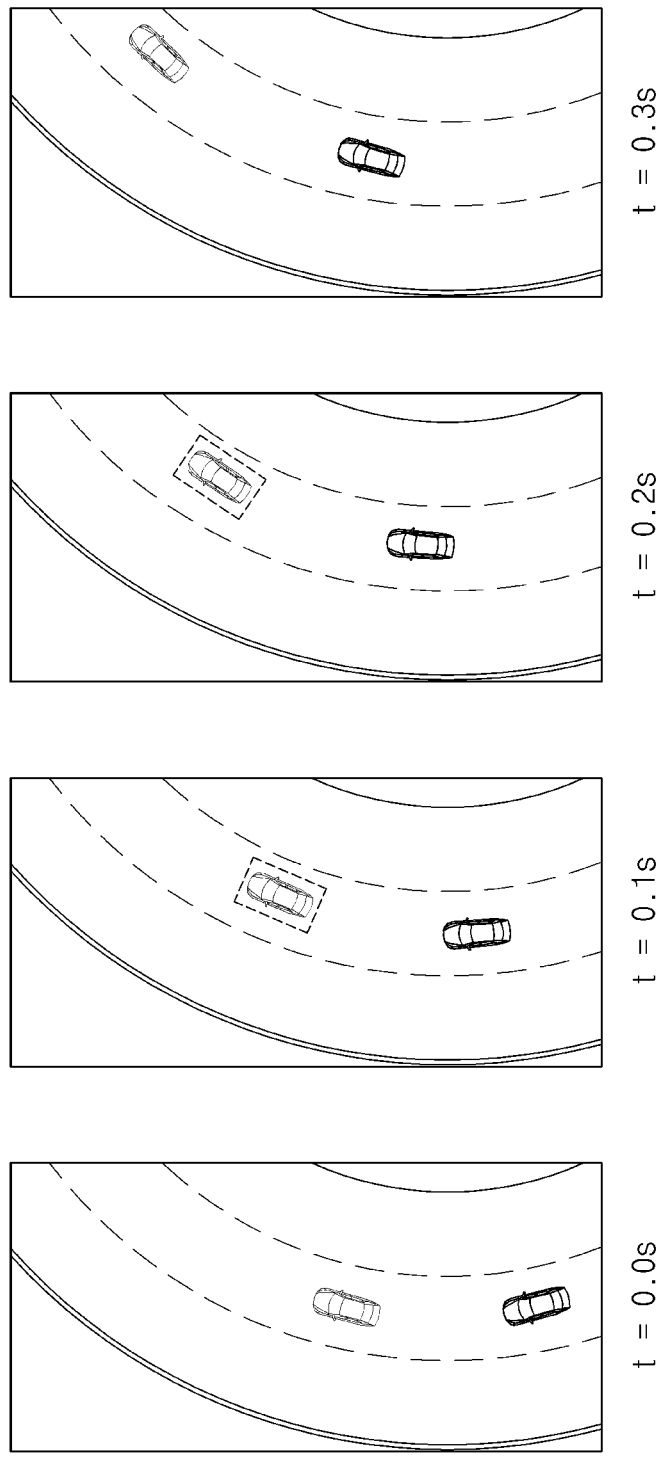

FIGS. 4A and 4B are drawings illustrating a function of performing position correction according to another embodiment of the present disclosure. In particular, FIGS. 4A and 4B illustrate a position of a host vehicle and that a position correction function is performed according to another exemplary embodiment of the present disclosure.

Comparing FIG. 4A with FIG. 4B, as an example, FIG. 4A shows where there is no position correction function since RV information is not received when communication disconnection occurs when t=0.1 s to 0.2 s differs from FIG. 4B where reception omission is predicted upon the reception omission and where a position of an RV is estimated and corrected according to another exemplary embodiment of the present disclosure. Thus, another exemplary embodiment of the present disclosure may further include a position compensation function for correcting and providing a position of the HV and a position of the RV with regard to a communication delay between the communication ECU and the AP ECU, which are provided as divided units, and data reception omission. In other words, another exemplary embodiment of the present disclosure may be configured to predict a communication delay value between internal units and a compensation value for data reception omission and provide the result of performing position correction on a display of the AP ECU, thus enhancing user satisfaction and providing a V2X service with higher reliability.

Figure 5:
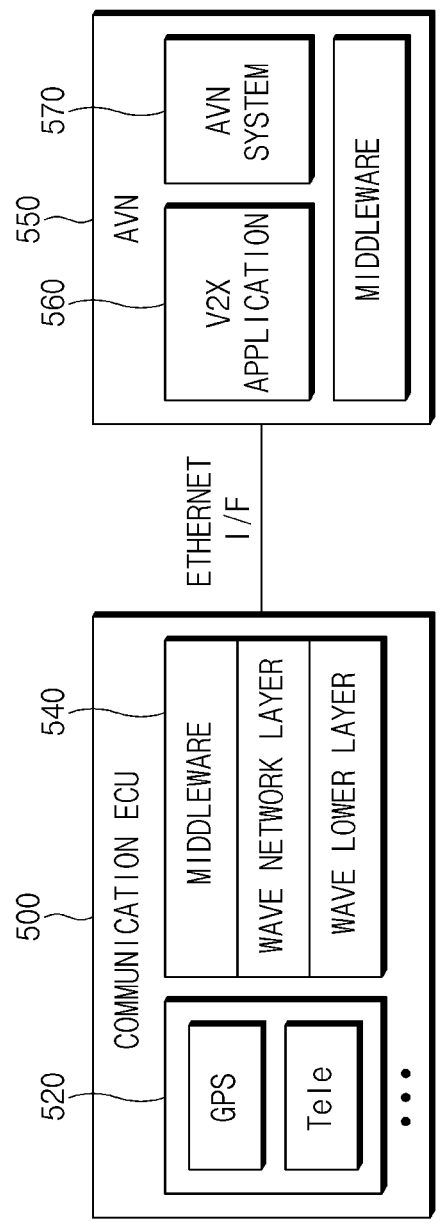
FIG. 5 is a block diagram schematically illustrating an AVN system for a V2X communication service according to an exemplary embodiment of the present disclosure.

FIG. 5 is a block diagram schematically illustrating an audio video navigation (AVN) system for a V2X communication service according to an exemplary embodiment of the present disclosure. Referring to FIG. 5, when an AVN ECU 550 operates in a capacity as an AP ECU supporting a V2X communication system, the AVN ECU 550 may be configured to provide a user with image information using V2X information. For example, according to an exemplary embodiment of the present disclosure, since a communication ECU and an AP ECU are formed separately, software (SW) according to supporting of a V2X service may be additionally configured in a previously provided AP ECU.

As a V2X application area is implemented via the AVN ECU 550, the cost of developing a system for implementing a separate V2X AP may be reduced and a V2X service may be more efficient than in an existing system. In other words, since a V2X communication module and an AP SW are configured to operate in different ECUs, a corresponding V2X system may be implemented adaptively according to a necessary service. Particularly, an APN may be configured to receive a position of a host vehicle, which is detected using a GPS sensor, a gyro sensor, an acceleration sensor, or the like, and may be configured to receive a path of a set destination from a telematics server when the destination is set by a user. In this case. In other words, users may determine and respond to a variety of road traffic information including traffic situations using a remote information service capable of transmitting and receiving a variety of information in real time via mobile communication, the Internet, or a navigation system based on sensors of the host vehicle, and may receive vehicle safety, security, diagnosis, communication, navigation, and a personalized information service for a user. As an interval where such V2X communication messages may be processed and an AP processing interval may be separated, a navigation AP may be configured to display additional information on a display thereof and output the additional information as sound guidance through a speaker thereof.

Herein, the traffic information center may be configured to collect and transmit a variety of traffic information and perform overall analysis of traffic situations and traffic management, observe flow, accident, or congestion of road traffic, for example, an unexpected situation such as road construction or street demonstration, and provide a user with road and traffic information in real time. Traffic information may be collected using a CCTV video, a real-time signal control system, a detector, a GPS, a traffic operator, a traffic police, a general call, or the like. The collected traffic information may be analyzed and processed through an advanced automatic processing system to be provided in real time through the Internet, a TV, a radio station, a guidance call, a guidance service app, or the like. Data for such a V2X AP may be displayed through an AVN AP. Thus, to safely and conveniently maintain the vehicle using position information of the vehicle, which is detected by the AVN AP, and a wireless communication network, route guidance may be provided to passengers of the vehicle, traffic information may be provided, a safety convenience service such as emergency recovery information and an infotainment service such as the Internet, a movie, or a game may be provided to a user.

Figure 6:
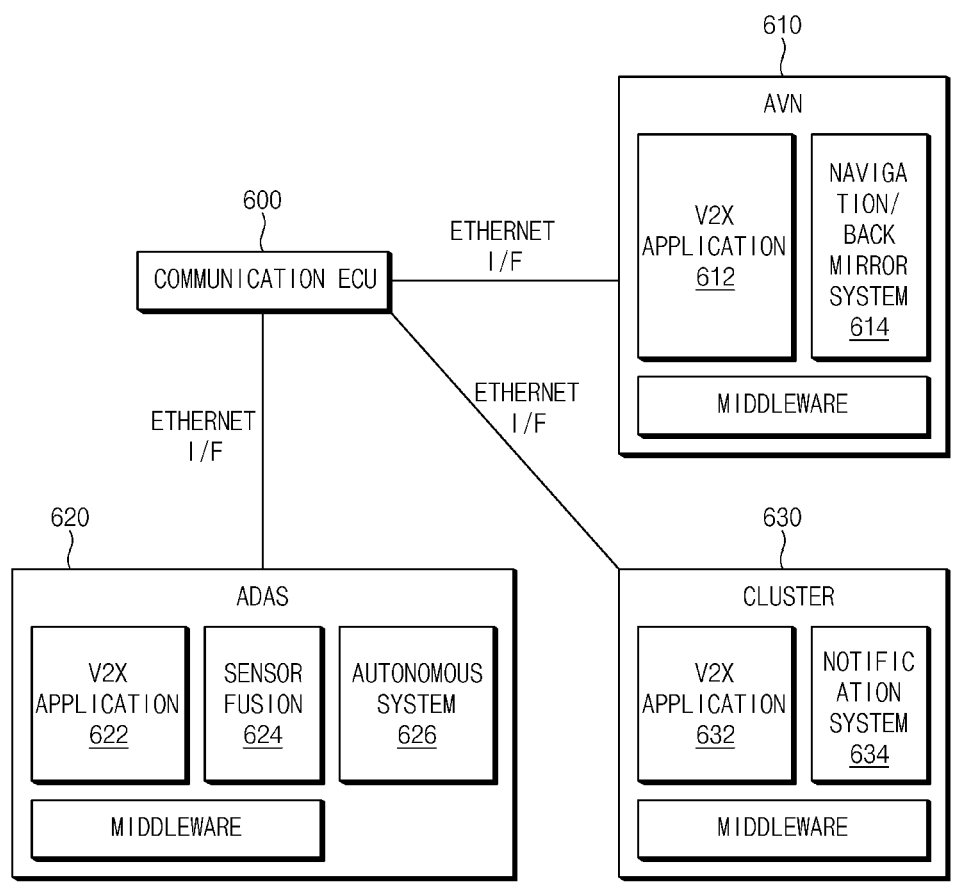
FIG. 6 is a block diagram illustrating a plurality of V2X application systems for supporting V2X communication according to an exemplary embodiment of the present disclosure.

FIG. 6 is a block diagram illustrating a plurality of V2X application systems for supporting V2X communication according to an exemplary embodiment of the present disclosure. Referring to FIG. 6, a communication ECU 600 for processing V2X communication signals of a WAVE system based on a GPS, telematics, and Wi-Fi and a 3GPP system may be configured to transmit and receive a V2X message with AP systems 610, 620, and 630 to support a V2X service.

The ADAS system 620 may include a V2X application device 622, a sensor fusion 624, and an autonomous system 626 and may be configured to identify a V2X message received from a V2X communication vehicle on the road, which is traveling, a V2X infrastructure, a terminal in another vehicle, and the like based on a V2X message received from a communication ECU 600 to assist with acceleration and brake pedals of the vehicle, which is traveling, and steering and to more efficiently provide a driving service of a driver. As an example, vehicle A, which is traveling, may maintain a vehicle speed with regard to a speed set on the highway by a driver, a predetermined inter-vehicle distance, and the speed limit of the road by reflecting V2X information received from vehicles B and C in the vicinity of vehicle A, and may be configured to perform semi-autonomous driving, reduce a vehicle speed when vehicle A is in a safety section, or determine a curved road in advance to reduce a speed and smoothly and safely travel on the curved road.

Furthermore, as the received V2X message and information are reflected in an AVN system 610, a variety of information such as traffic congestion information, safety driving information, and oil price information may be provided through a user interface via a V2X application layer 612. As an example, when a road construction and a dangerous situation are predicted ahead of a vehicle, the communication ECU 600 may be connected with an emergency service center which previously interworks via a navigation/back mirror system 614 to notify a surrounding vehicle of emergency rescue requests.

Alternatively, the communication ECU 600 may support a wireless Internet connection of a portable device via Wi-Fi in a wireless Internet vehicle to share a road situation and an emergency item. Such a V2X message may provide support in the form of various media based on a capability of the AVN system 610. In other words, the V2X message may be provided through information about various media such as a radio, a DMB, an audio/MP3/video CD, a DVD, and AUX and may be compatible with a USB or Bluetooth steaming audio. Alternatively, the same V2X information may be shared with a user terminal at a rear seat of the vehicle by applying a rear-seat entertainment system (RSE) in the vehicle.

Furthermore, V2X messages may be displayed on a cluster system 630, that is, a dashboard in the vehicle. An existing dashboard indicates a simple numerical value, such as a speed and RPM of the vehicle or only information of a warning light. However, a vehicle such as a V2X smart car, a connected car, and an autonomous vehicle according to an exemplary embodiment of the present disclosure may be configured to display operation situations of various functions such as autonomous driving and a lane maintaining assist function as well as various information, for example, a distance from a front vehicle, pedestrian recognition, and a vehicle approach warning. In other words, a configuration of a screen may be freely changed according to a V2X message, V2X information according to a user setting, and importance of the message through a digital cluster system. Alternatively, the digital cluster system may be configured to selectively apply only information necessary for a driver.

An exemplary embodiment of the present disclosure may separately implement a communication ECU for processing V2X communication and an ECU for handling an application function to reduce the cost of manufacturing a V2X system, which is for implementing the V2X system. In other words, the communication ECU and the application ECU may be divided and modularized to facilitate diversity and portability of the V2X system.

Furthermore, as autonomous driving performance may be enhanced by developing a V2X function used for an ADAS and autonomous driving, software for processing a V2X function may be updated in an existing system to support a corresponding service. For example, with the development of communication technology for providing information regarding an IC/JC branch part and processing tollgate information and information such as a reversible lane and stop vehicle warning and with the development of a V2X function for processing corresponding information, a V2X service may be more efficiency supported.

Figure 7:
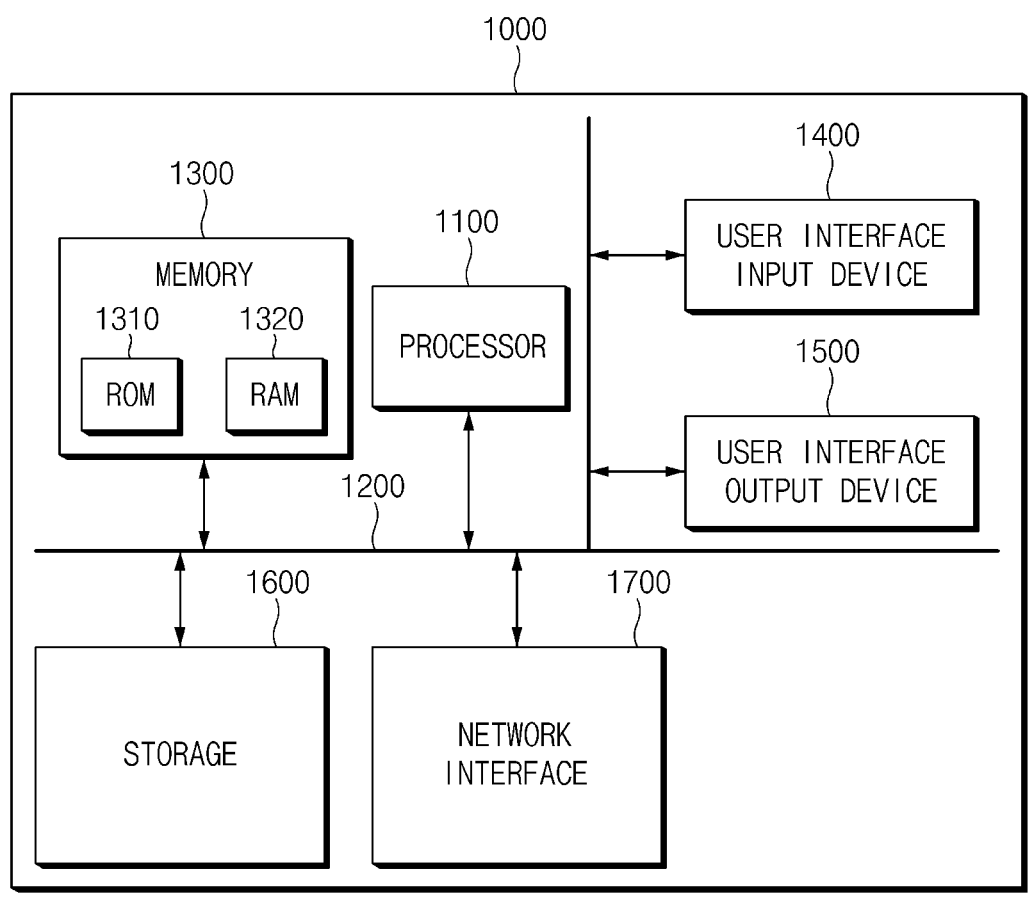
FIG. 7 is a block diagram illustrating a computing system according to an exemplary embodiment of the present disclosure.

FIG. 7 is a block diagram illustrating a computing system according to an exemplary embodiment of the present disclosure. Referring to FIG. 7, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device configured to process instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory). Thus, the operations of the method or the algorithm described in connection with the exemplary embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The present technology may provide additional information with higher reliability to a driver who uses a V2X communication service. In other words, the present technology may be configured to separately perform the processing of wireless communication information and the processing of V2X data by separately operating a V2X communication device and a V2X application device, thus adaptively operating a system. Thus, the present technology may more efficiently display V2X information on an application device selected by the user. Thus, the present technology may provide a vehicle communication service having user satisfaction and high service reliability by providing V2X information with higher reliability to the driver. In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A vehicle to everything (V2X) communication device, comprising:
 a communication electronic control unit (ECU) configured to process a message transmitted and received wiredly or wirelessly; and
 an application (AP) ECU configured to identify the message transmitted and received at the communication ECU through an internal protocol for a vehicle and provide corresponding service information,
 wherein the AP ECU includes a system area separated from the communication ECU, and
 wherein the AP ECU and the communication ECU are configured to transmit and receive the message via Ethernet or controller area network (CAN) communication as the internal protocol for the vehicle.

2. The V2X communication device of claim 1, wherein the communication ECU is configured to communicate with a wireless access in vehicular environment (WAVE) communication system based on wireless-fidelity (Wi-Fi) and a long term evolution/new radio (LTE/NR) communication system based on the 3rd generation partnership project (3GPP) and perform bidirectional communication between a host vehicle and a remote vehicle, between the host vehicle and a pedestrian, between the host vehicle and a road infrastructure, or between the host vehicle and a network to support a V2X service.

3. The V2X communication device of claim 2, wherein the AP ECU is configured to identify a V2X service message transmitted from the communication ECU and display the V2X service message using a corresponding application.

4. The V2X communication device of claim 3, wherein the AP ECU includes at least one of an advanced driver assistance system (ADAS), an audio video navigation (AVN) system, and a cluster system.

5. The V2X communication device of claim 3, wherein each of the communication ECU and the AP ECU is configured to identify the V2X service message and process, classify, or manage the V2X service message.

6. The V2X communication device of claim 5, wherein the V2X service message is generated, updated, or discarded in the form of a list.

7. The V2X communication device of claim 5, wherein the V2X service message is transmitted at a period of 100 ms, and the V2X service message is transmitted when the ignition is on and stops being transmitted when the ignition is off.

8. The V2X communication device of claim 3, wherein the AP ECU further includes:
 a position correction for a host vehicle and a remote vehicle with regard to a transmission time delay of a V2X service message transmitted and received from the communication ECU,
 wherein the time delay includes a delay value generated upon transmission and reception of the Ethernet or CAN communication, and
 wherein the delay value is variably set by an estimated value or an experimental value.

9. The V2X communication device of claim 7, wherein the AP ECU further includes:
 a position correction for a host vehicle and a remote vehicle with regard to reception omission of a V2X service message transmitted and received from the communication ECU, wherein the reception omission is generated upon transmission and reception of the Ethernet or CAN communication, and wherein the position correction is performed by predicting a compensation value for the reception omission.

10. The V2X communication device of claim 6, wherein the communication ECU and the AP ECU are configured to synchronize a list of the V2X service message, and the synchronizing is applied to when the ignition is on or when the ignition is off.

11. A V2X communication method, comprising:

processing, by a processor, a message transmitted and received wiredly or wirelessly; and identifying, by the processor, the transmitted and received message through an internal protocol for a vehicle and displaying service information corresponding to the message using a corresponding application, wherein an area processing the message and an area displaying the service information using the application are separated system areas, and wherein the internal protocol for the vehicle transmits and receives the message via Ethernet or controller area network (CAN) communication.

12. The method of claim 11, wherein the processing of the message includes:

communicating, by the processor, with a WAVE communication system based on Wi-Fi and an LTE/NR communication system based on the 3GPP, wherein the message includes a message for supporting a V2X service by performing bidirectional communication between a host vehicle and a remote vehicle, between the host vehicle and a pedestrian, between the host vehicle and a road infrastructure, or between the host vehicle and a network.

13. The method of claim 12, wherein the displaying includes:

identifying, by the processor, the message for supporting the V2X service; and displaying, by the processor, the V2X service message on a corresponding application system.

14. The method of claim 13, wherein the displaying includes:

displaying, by the processor, information corresponding to the V2X service message on at least one of an advanced driver assistance system (ADAS), an audio video navigation (AVN) system, and a cluster system.

15. The method of claim 13, wherein the processing of the message includes:

identifying, by each of the communication ECU and the AP ECU, the V2X service message; and processing, classifying, or managing, by each of the communication ECU and the AP ECU, the V2X service message.

16. The method of claim 15, wherein the V2X service message is generated, updated, or discarded in the form of a list.

17. The method of claim 15, wherein the V2X service message is transmitted at a period of 100 ms, and the V2X service message is transmitted when the ignition is on and stops being transmitted when the ignition is off.

18. The method of claim 13, wherein the displaying further includes:

performing, by the processor, a position correction for a host vehicle and a remote vehicle with regard to a transmission time delay of a V2X service message transmitted and received from the communication ECU, wherein the time delay includes a delay value generated upon transmission and reception of the Ethernet or CAN communication, and wherein the delay value is variably set by an estimated value or an experimental value.

19. The method of claim 17, wherein the displaying further includes:

performing, by the processor, a position correction for a host vehicle and a remote vehicle with regard to reception omission of a V2X service message transmitted and received from the communication ECU, wherein the reception omission is generated upon transmission and reception of the Ethernet or CAN communication, and wherein the position correction is performed by predicting a compensation value for the reception omission.

20. The method of claim 16, wherein the processing of the message further includes:

synchronizing, by the communication ECU and the AP ECU, a list of the V2X service message, and wherein the synchronizing is applied to when the ignition is on or when the ignition is off.

* * * * *